J. HESSE.

Carpet-Sewing Machine.

No. 8,830. Reissued Aug. 5, 1879.

*Witnesses:*

J. Russell Bar

J. P. Th. Lang.

*Inventor:*

Joseph Hesse by

Mason Fenwick & Lawrence

N. PETERS, PHOTO-LITHOGRAPHER, WASHINGTON, D. C.

J. HESSE.
Carpet-Sewing Machine.
No. 8,830. Reissued Aug. 5, 1879.
Fig 6.
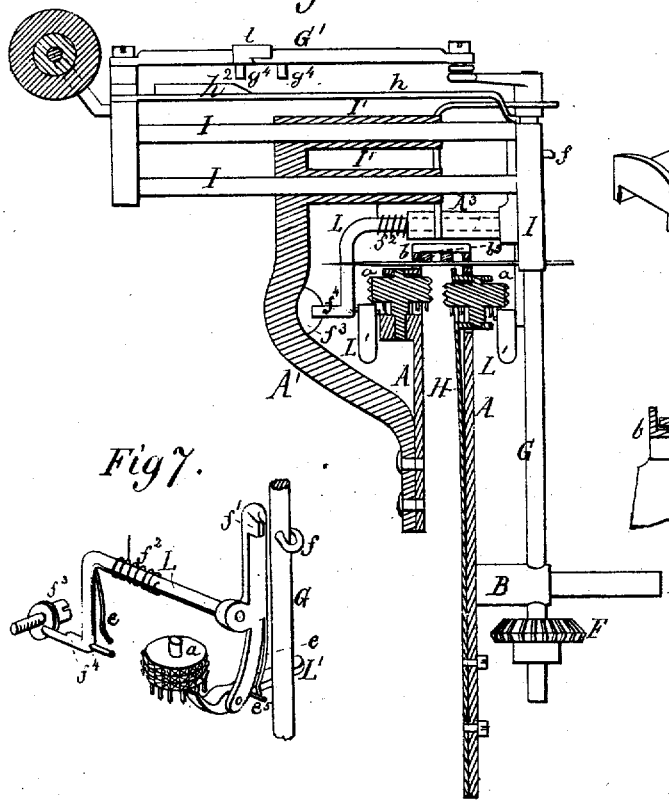
Fig 8.
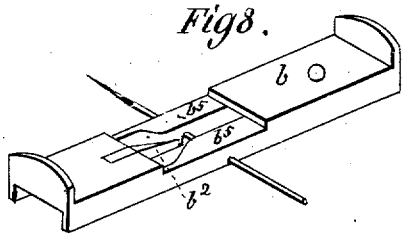
Fig 9.
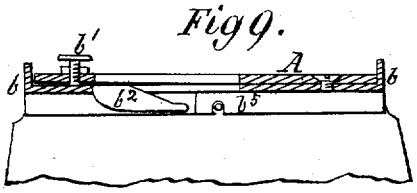
Fig 7.
Fig 4.
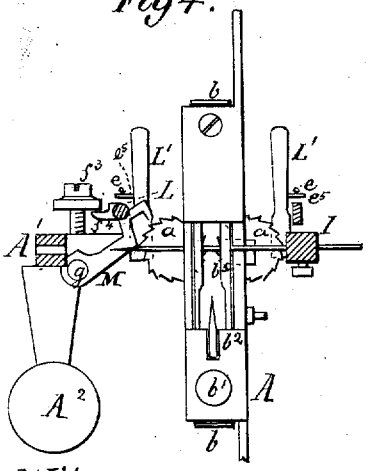
Fig 3.
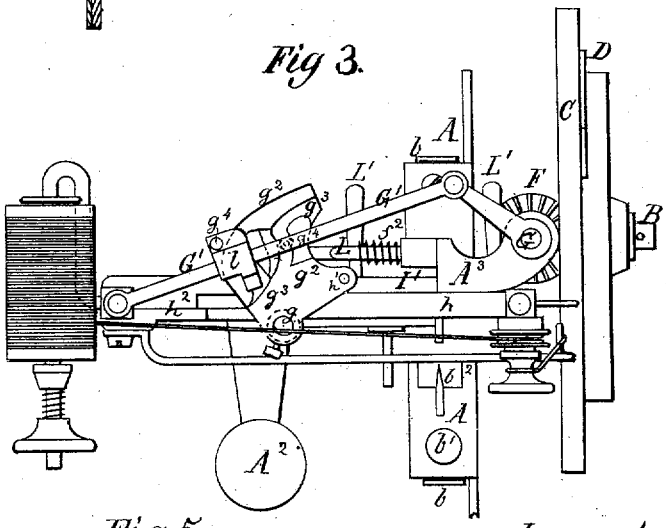
Fig 5.
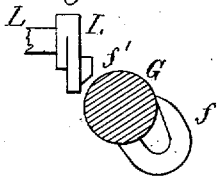
Witnesses:
S. Russell Bart
J. F. Th. Lang.
Inventor
Joseph Hesse
by Mason Fenwick & Lawrence
N. PETERS, PHOTO-LITHOGRAPHER, WASHINGTON, D. C.

UNITED STATES PATENT OFFICE.

JOSEPH HESSE, OF SAN FRANCISCO, CALIFORNIA, ASSIGNOR OF ONE-HALF INTEREST TO THOMAS G. CANTRELL.

IMPROVEMENT IN CARPET-SEWING MACHINES.

Specification forming part of Letters Patent No. 195,277, dated September 18, 1877; Reissue No. 8,830, dated August 5, 1879; application filed May 3, 1879.

*To all whom it may concern:*

Be it known that I, JOSEPH HESSE, of the city and county of San Francisco, and State of California, have invented certain new and useful Improvements in Carpet-Sewing Machines, which invention is fully described in the following specification, reference being had to the accompanying drawings, forming part of the same.

Figure 1:
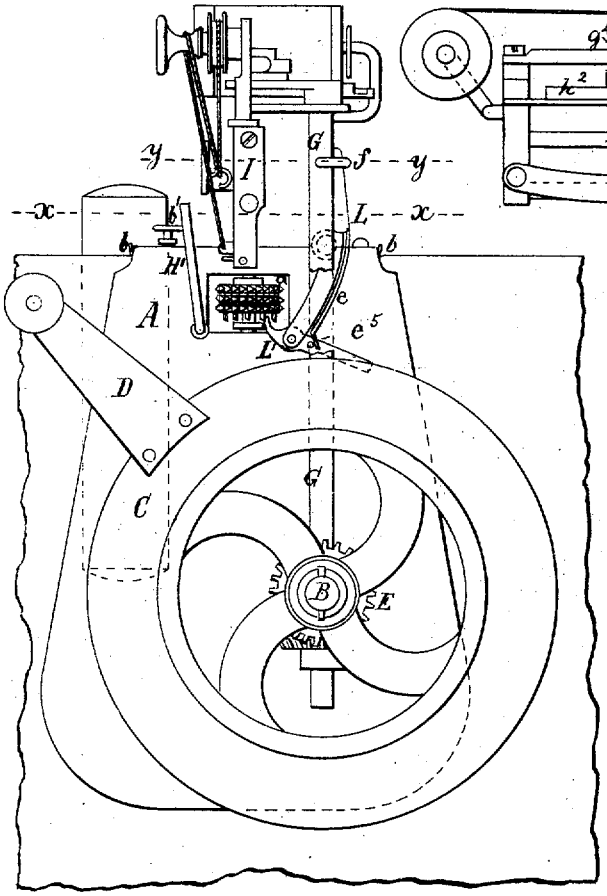
Figure 2:
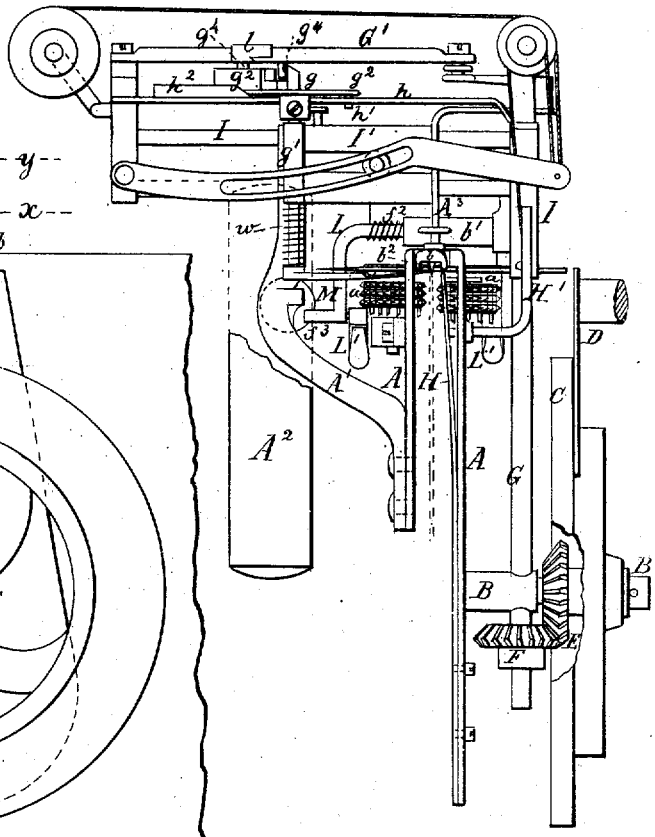
Figure 10:
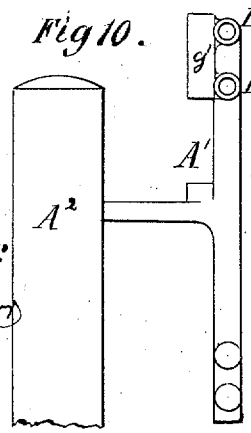
Figure 11:
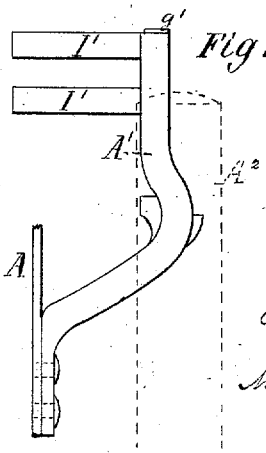

Figure 1 is a side elevation of my improved sewing-machine in working position. Fig. 2 is a front elevation taken from the left-hand end of Fig. 1. Fig. 3 is a top view of the machine. Fig. 4 is a horizontal section in the line *x x* of Fig. 1. Fig. 5 is a section, in detail, on the line *y y* of Fig. 1, showing a section of the upright driving-shaft just above the feed-actuating cam, and a top view of a portion of the rock-shaft and its arm. Fig. 6 is a vertical transverse section of the machine in the plane of the needle. Fig. 7 is a detail diagram of a portion of the feed-motion. Fig. 8 is a detail diagram, in perspective, of the plate for guiding the carpet and gaging the sewing with respect to the edges of the carpet, the needle being also shown in this view. Fig. 9 is a vertical central longitudinal section of the same. Figs. 10 and 11 show a side and end view of the needle-bar guide-frame.

My invention relates to a machine for sewing the seams of carpets in making them up from the piece; and its object is to produce a machine which is readily managed and easily operated by hand, and which performs the work required of it in a more rapid and uniform manner than is at the present time possible by the hand process, and which is adapted to rest upon and astride of the edges of the material being sewed, and to travel thereon while it is sewing the edges together.

In my machine the frame which carries all the working parts is made of a plate bent or formed into a saddle of inverted U shape, adapted to rest astride of and travel upon the edges of the material to be united, and an intermittent feed acts against the surface of the material held stationary and in a vertical position, and moves the machine progressively forward to space the stitches. The needle is reciprocated in a horizontal path from one side of the machine, and the loops of thread for forming the stitches are interlocked by a horizontally-oscillating and vertically-reciprocating hook operating on the opposite side of the machine.

My invention consists, first, in the combination, with a saddle-frame adapted to rest astride of and ride upon the edge of the material being sewed, of stitch-forming mechanism, whereby a machine adapted for sewing can be moved on the edge of stationary material, and while being moved can sew the material.

It consists, secondly, in the combination, with a saddle-frame adapted to rest astride of and ride upon the edge of the material being sewed, of stitch-forming and feeding mechanisms, whereby a machine adapted for sewing is automatically fed along on the edge of the material, and while moving sews the material.

It consists, thirdly, in the combination, with the saddle-frame adapted to rest astride of and travel over the edges of the material to be united, of means for moving said frame automatically and intermittently forward step by step, to space the stitch, said mechanism being capable of adjustment to regulate the length of the intermittent progressive movements.

It consists, fourthly, in the combination of stitch-forming mechanism *a*, the saddle-frame, and an automatic intermittently-acting feed mechanism, acting positively on the two sides of the material being sewed, while the saddle-frame presses down upon the upper edges of the material.

It consists, fifthly, in a sewing-machine adapted to rest astride of and to ride upon the edge of the material sewed, in the combination of a saddle-frame, stitch-forming mechanism, a spring presser-plate, a feed-roller attached to the presser-plate, means for moving said plate, a feed-roller attached to the presser-plate, and mechanism for rotating said roller, whereby the two thicknesses of material can be compressed near their edges, and the feed-roller can be moved inward and outward with the presser-plate, and is rendered capable of yielding to the material against which it bears and over which it rolls.

It consists, sixthly, in a machine adapted to rest astride of and to ride upon the edge of the material being sewed, in the combination of stitch-forming mechanism, a saddle, and an adjustable gage-plate applied under the bend of the saddle, and adapted to be raised and lowered with respect to the needle, whereby the machine is rendered self-guiding by having the edges of the material always in contact with the under portion of it, and at the same time the distance of the line of sewing from the edges of the material can be regulated as desired.

It consists, seventhly, in a plate beneath the bend of the saddle-frame, which is adapted for first readily receiving the two ends of the carpet, at the upper edge, while in an uncompressed condition, and then of compressing said ends and the upper edges of the carpet just previous to the passage of the needle through the same; also, for holding the sewed portion under compression until the stitches appear beyond the rear of the saddle-frame.

It consists, eighthly, in a sewing-machine adapted to rest astride of and ride upon the material being sewed, in the combination of a saddle-frame, stitch-forming mechanism, feeding mechanism, and a downwardly-projecting point, which is adapted to move with the machine and enter centrally between the edges of the carpet sewed, and to turn in and out of the way of the needle, just in front of the transverse path of the needle, the wool or any such portions of the right side of the carpet as may be frayed or raveled out, and thereby permit the needle to pass unobstructedly through the selvage edges of the carpet, thus insuring more perfect seams.

It consists, ninthly, in the gage-plate *b*, having the downwardly-extending point and contracted channel.

It consists, tenthly, in a sewing-machine, in the combination of a saddle-frame adapted to rest astride of and to ride upon the edges of the material being sewed, a feed mechanism to move the said saddle-frame intermittently and regularly forward over the edges of the material, and a device for regulating the distance of the line of sewing from the edges of the material, as hereinafter described.

It consists, eleventhly, in a sewing-machine, in the combination of a saddle-frame adapted to rest astride of and ride upon the edges of the material being sewed, an automatic feed to move the said frame intermittently forward over the edges of the material, an eye-pointed needle reciprocated in a horizontal path and through slots or apertures in both limbs of the saddle-frame, an oscillating looper situated and operating upon that side of the saddle-frame opposite to where the needle enters the apertures to engage with and interloop the needle-thread, and means for operating the parts comprising the combination, all combined as hereinafter set forth.

It consists, twelfthly, in a sewing-machine adapted to rest astride of and to ride upon the edges of the material being sewed, in the combination of the saddle-frame, the needle-bar, the upright driving-shaft with its crank-arm, the connecting-rod, carrying studs, a grooved cam-plate, horizontally-oscillating looper-rod, the needle, and the looper, whereby the looper is oscillated horizontally, and the needle also reciprocated horizontally, by one driving-shaft.

It consists, thirteenthly, in the combination of certain means for producing an up-and-down movement of the looper with certain means for producing an oscillation of the looper and a horizontal reciprocation of the needle, whereby all of the means are operated by one shaft.

It consists, fourteenthly, in the combination of the oscillating looper, its rod, a guide-bar, a needle-bar, a connecting-rod, a crank-arm, means for operating said rod and crank, and devices for producing the up and down movements of the looper, as hereinafter described.

It consists, fifteenthly, in the combination of a handle for steadying the machine, the hand crank-wheel, and the saddle-frame, whereby while the machine is operated by the crank-handle with one hand on one side of the saddle-frame it can be steadied with the other hand of the operator on the other side of the saddle-frame.

It consists, sixteenthly, in a sewing-machine, in the combination, with the horizontally-rotating feed-rollers, of the mechanism for actuating them, consisting of the rocking bar, independent spring-pawls, the continuously-revolving shaft with its cam, and the feed-regulating screw and spring, whereby the feed for the stitches may be regulated, and thus the stitches shortened or lengthened, and whereby, also, the adjustable mechanism is set in motion by the shaft which operates the needle and looper mechanisms.

I make the frame A A of the machine of a saddle shape, or of the form of an inverted U, with two limbs extending downward from the bend, with sufficient space between them to readily receive the two thicknesses of the material to be sewed. One of the limbs is provided with a stud or bearing, B, to hold the hand crank-wheel C, and the other limb supports a bracket, $A^1$, on the end of which is a guide-frame, I′, for the reciprocating needle-bar I. The bracket $A^1$ of the guide-frame I′ has also a rigid bar or handle, $A^2$, which is placed at the side of the frame opposite to the driving-wheel, for the purpose of guiding or steadying the machine as the hand-wheel is revolved.

The saddle-frame A, within its bend or loop formed by the junction of its two limbs, is furnished with an adjustable gage-plate, *b*, to regulate the distance of the line of sewing from the edges of the material. This plate is made with a channel on its under side, and this channel serves as a guideway for the edges of the material being sewed together. The channel is contracted in width some distance from its forward end, as indicated at $b^5$, so as to laterally compress the two edges of the material being sewed just before the needle penetrates the same; and at this point $b^5$ I provide a downwardly-projecting point, $b^2$, in line with the space between the two pieces of material and in front of the path of the needle. This point is attached to the plate $b$. The plate $b$ is made adjustable vertically by means of a set-screw, $b^1$, which is placed to work through the saddle-frame at the top and against the upper face of the plate. The saddle-frame thus provided with the plate $b$ will, when placed astride of the work, rest with its plate $b$ bearing immediately upon the edges of the material being sewed; and as the plate is adjustable by the screw $b^1$ both toward and from the line of sewing, or the needle-apertures through the limbs of the saddle-frame, the distance of the line of stitches from the edge of the material can be perfectly regulated, and the control of the same is under the operator while the sewing progresses.

The wider part of the channel of the plate $b$ affords a ready entrance for the material to be sewed, while the contracted part, beginning at $b^5$, operates to compress the outside edges of the material as they approach the needle, or just before the needle acts upon them, and the downwardly-projecting point $b^2$ occupies a position midway of the two pieces of material being sewed, and comes in contact with and turns in out of the way of the needle such portions of the right side of the material as may be frayed or raveled out.

Within the space between the limbs of the saddle-frame I place a spring presser-plate, H, with its lower end secured to one side of the saddle-frame A, and the upper end free and pressing toward the opposite side or limb of the frame, so as to compress between these two parts the material to be sewed, and to properly press and hold together the two thicknesses near the point of penetration of the needle. This presser-plate is provided with a handle, H′, by which it is drawn back in placing the machine upon or removing it from the work. This handle, as shown in Fig. 1, projects through a hole or slot in the saddle-frame A, and is bent upward at the end outside the saddle-frame. One of the feed-rollers $a$ is held in bearings fixed to the spring presser-plate H, and when the presser-plate is drawn backward this roller is also moved away from the material.

The saddle-frame A thus constructed is provided with two horizontally-rotating roughened or serrated wheels or rollers, $a$ $a$, one being attached to the saddle-frame A and the other to the presser-plate H, and these rollers are actuated, by means which will presently be described, intermittently and uniformly at one and the same time. The feed-wheels are so applied that they act upon both sides of the material through the sides of the saddle-frame when said saddle-frame is placed astride of the edges of the material suspended vertically; and the means for actuating the rollers consist of a rock bar or shaft, L, held in bearings at the back of the bracket $A^3$, and carrying on its downwardly-bent ends two pawls, L′ L′, one for each roller. The pawls are pivoted independently of each other, and work beneath and engage with pins or ratchet-teeth on the under side of the feed-rollers $a$ $a$, (see Fig. 7,) and either of the pawls may be thrown out of action, and at such time will be held back by the spring $e$ and pin $e^5$, whenever it is desired to stop the feeding action of either one of the rollers, this being necessary in moving or adjusting the sides or breadths of the carpet with each other to properly match the pattern.

The motion of the rocking bar L is produced by a fixed cam or projection, $f$, on the upright rotating shaft G, which bears against or is in contact with an upright arm projecting from the bar, the two being kept in contact by a spring, $f^2$. The joint action of this rocking bar, cam, and the spring $f^2$ produces an intermittent oscillating movement of the pawls which act upon the feed-rollers.

The feed or length of movement of the saddle-frame upon the material after each reciprocation of the needle is controlled by means of a screw, $f^3$, upon the standard $A^1$. The head of this screw is placed in line with, and so that it may be struck by, the small projection or arm $f^4$, whose length of movement is consequently limited by the position of the screw $f^3$. The extent of movement of the bar L is lessened and the stitch shortened by turning down the screw $f^3$, and by turning this screw in the reverse direction the stitch is lengthened.

I employ a straight eye-pointed needle, and move it in a horizontal path by the reciprocation of the needle-bar I. This bar slides in bearings in the guide-frame I′, and it is moved by means of a top crank on the driving-shaft G and a connecting-rod, G′, attached thereto and to the rear end of the needle-bar.

Upon the needle-bar I, and carried by it, are also the spindle for the thread-spool, thread-tension device, and slack take-up, as shown in Fig. 2.

I also employ a horizontally-oscillating and a vertically-reciprocating looper, M, and it is fixed to the lower end of a vertical rod, $g$, by which it is carried. This looper is in close proximity to the needle-point, and on the opposite side of the machine to that where the needle enters its apertures in the saddle-frame, as shown.

The rod $g$ has a horizontal oscillating movement, and also a short vertical reciprocating movement, in a guide-tube, $g^1$, fixed to the guide-frame I′.

The horizontal oscillating movement of the looper and its rod is produced by the horizontal plate $g^2$, secured upon the upper portion of the vertical rod $g$, and having cam grooves or slots, into which the studs or fixed projections $g^4$ on the under side of the connecting-rod G′ and plate $l$ are caused to enter and work during the reciprocations of the needle-bar I.

The forward and backward movements of the rod G′ produced by the crank causes the studs to move in an elliptical path, and as they enter and pass through the cam-slots in the plate $g^2$ they produce a horizontal oscillating movement of the plate, shaft, and looper; and at proper intervals a short upward movement of the looper and shaft is produced (in order to have the looper properly take the loop of the needle-thread) by means of an elevated part, $h^2$, of the guide-bar $h$, which lifts the rod $g$.

The plate $g^2$ is guided by a pin, $h^1$, and the guide-bar $h$ as it is elevated by the portion $h^2$ of the said guide-bar; and at the return movement of the plate $g^2$ the rod $g$ is brought down again to depress the looper (and thereby readily clear said looper of the loop) below the needle-point by the action of a spiral spring, $w$, between guide-tube $g^1$ and the lower arm carrying the looper M. This downward movement of the rod may be produced in a more positive manner than by a spring, $w$, by making the upper end of the rod $g$ with an inclined or beveled face, and placing a beveled block or stud, $l$, on the connecting-rod G′, and by the reciprocation of the connecting-rod this part $l$ will be caused to strike against the beveled end of the rod $g$ and force it downward after each upward movement is produced by the means previously described for producing such upward movement.

In the operation of my machine the carpet to be sewed is suspended by means of hooks or clamps after the manner adopted in hand-sewing, and the needle of the machine is drawn back and the presser-plate held back by its handle, and the machine placed astride the edges of the two pieces of carpet to be sewed together. The handle H′ is now released, and the gage-plate adjusted to regulate the distance between the edge of the carpet resting against the under side of the gage-plate and the path traveled by the needle through the sides of the said saddle-frames. The handle $A^2$ is now grasped by the left hand of the operator to steady the machine, while with the right hand the operator turns the crank-wheel C.

With my invention the edges of carpets can be united in a rapid, easy, and uniform manner, with equal tension and length of stitches throughout the entire length of seam, and thus the tedious work of making up carpets by hand can be performed at far less cost and labor by machinery.

The machine, as represented, is provided with suitable gearing, E F, for transmitting the motion of the hand crank-wheel to the other mechanism.

What I claim as new is—

1. The combination of the saddle-frame adapted to rest astride of and upon the edge of the material being sewed with stitch-forming mechanism carried thereby and moving therewith, whereby said parts are adapted to be moved along the edges of stationary material and unite the same, substantially as described.

2. The combination, with a saddle-frame adapted to rest astride of and ride upon the edge of stationary material being sewed, of stitch-forming mechanism and feeding mechanism applied thereto, whereby said parts are made to sew the material on which they are moved, and are also fed along the edge of the same, substantially as described.

3. In a sewing-machine, a saddle-frame to carry all the working mechanism, having downwardly-extending limbs A A, adapted to rest astride of and upon the edge of the material being sewed, in combination with a feed mechanism to move the said frame intermittently and regularly forward over the edges of the material, substantially as described.

4. In a sewing-machine adapted to rest astride of and to be moved upon the edge of the material being sewed, the combination of a saddle-frame, stitch-forming mechanism, double-feed mechanism to act upon and against both sides of the material, consisting of the two independently-rotating feed-rollers $a$ $a$, supported in bearings on opposite sides of the saddle-frame, and devices which rotate the rollers simultaneously and intermittently in a forward direction and with a regular movement, substantially as described.

5. In a sewing-machine adapted to rest astride of and to be moved upon the edge of the material to be sewed, the combination of a saddle-frame, stitch-forming mechanism, a spring presser-plate, H, means for moving said plate, a feed-roller attached to the presser-plate, and mechanism for rotating the feed-roller, substantially as described.

6. In a sewing-machine adapted to rest astride of and to ride upon the edge of the material being sewed, the combination of stitch-forming mechanism, a saddle-frame, and an adjustable gage-plate, $b$, applied under the bend of the saddle-frame, and devices for adjusting said plate with respect to the needle, substantially as and for the purpose described.

7. The plate $b$, provided with the channel or guideway, contracted as at $b^5$, substantially as and for the purpose described.

8. In a sewing machine adapted to rest astride of and ride upon the material being sewed, the combination of a saddle-frame, stitch-forming mechanism, feeding mechanism, and a downwardly-projecting point, $b^2$, which is adapted to move with the machine and enter centrally between the edges of the carpet sewed, and to turn in out of the way of the needle just in front of its path the wool or any portion of the right side of the carpet as may be frayed or raveled out, substantially as described.

9. The gage-plate $b$, having the downwardly-extending point $b^2$ and the contracted part $b^5$, substantially as described.

10. In a sewing-machine, the combination of a saddle-frame adapted to rest astride of and upon the edge of the material being sewed, a feed mechanism to move the said frame intermittently and regularly forward over the edges of the material sewed, and a device for regulating the distance of the line of sewing from the edges of the material, substantially as described.

11. In a sewing-machine, a saddle-frame adapted to rest astride of and upon the edge of the material being sewed, an automatic feed to move said frame intermittently forward over the edges of the material sewed, an eye-pointed needle reciprocated in a horizontal path and through slots or apertures in both limbs of the saddle-frame, an oscillating looper situated and operating upon that side of the saddle-frame opposite to where the needle enters its apertures to engage with and interloop the needle-thread, and means for operating the parts comprising the combination, all combined substantially as described.

12. In a sewing-machine adapted to rest astride of and ride upon the edge of the material being sewed, the combination of a saddle-frame, A A, needle-bar I, upright shaft G, having a crank-arm on its upper end, connecting-rod G′, carrying the studs $g^4$ $g^4$, cam-plate $g^2$, looper-rod $g$, looper M, and needle, substantially as and for the purpose described.

13. The means for producing the horizontal oscillation of the looper M, in combination with means described for producing the up and down movements of the looper, consisting of the guide-bar $h$, having the inclined projection $h^2$, the reciprocating needle-bar I, carrying said guide-bar $h$, the connecting-rod G′, having the beveled stud $l$, the looper-rod $g$, having the beveled end at top, the cam-plate $g^2$, provided with the pin $h^1$, and means for operating the rod G′, substantially as described.

14. The combination of the oscillating looper M, rod $g$, guide-bar $h$, needle-bar I, guide-frame I′, connecting-rod G′, plate $g^2$, and means such as described for operating the rod G′ and for producing the up and down movements of the looper, substantially as described.

15. The combination of the handle $A^2$, for steadying the machine, the hand crank-wheel C, and the saddle-frame A A, substantially as described.

16. In a sewing-machine, the combination, with the horizontally-rotating feed-rollers $a$ $a$, of the mechanism for actuating them, consisting of the rocking bar L, independent spring-pawls L′ L′, the continuously-revolving shaft G, with its cam $f$, and the feed-regulating screw $f^3$, and spring $f^2$, substantially as described.

In testimony that I claim the foregoing I have hereunto set my hand and seal this 10th day of April, 1879.

JOSEPH HESSE. [L. S.]

Witnesses:

C. W. M. SMITH,

EDWD. E. OSBORN.